Figure 1:
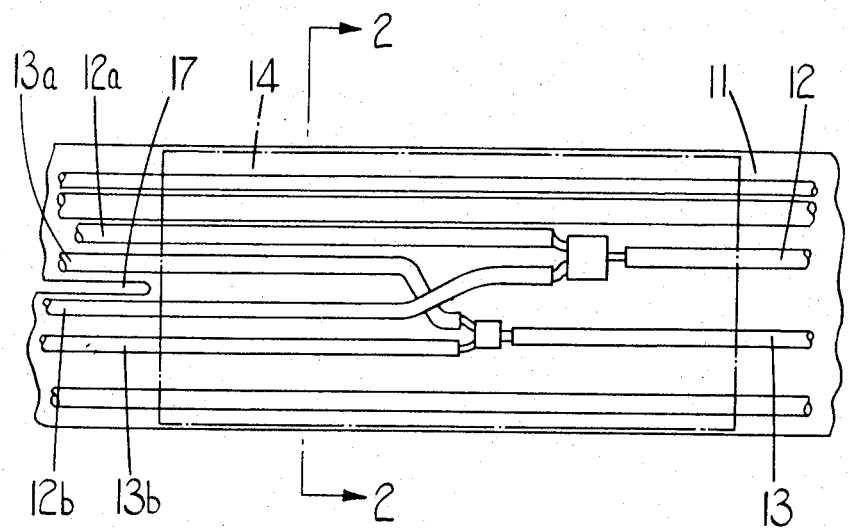

United States Patent [19]
Fry

[11] 3,819,848
[45] June 25, 1974

[54] WIRING HARNESSES
[75] Inventor: William Lawrence Fry, Haughton, England
[73] Assignee: Rists Wires & Cables Limited, Lyme, Staffordshire, England
[22] Filed: Sept. 7, 1973
[21] Appl. No.: 395,038

[30] Foreign Application Priority Data
Sept. 7, 1972  Great Britain.................... 41511/72

[52] U.S. Cl............ 174/72 A, 174/88 R, 174/117 F
[51] Int. Cl............................................. H02g 3/02
[58] Field of Search.... 174/70 C, 71 R, 72 R, 72 A, 174/88 R, 117 R, 117 F, 117 FF, 117 A

[56] References Cited
UNITED STATES PATENTS
| | | | |
|---|---|---|---|
| 3,074,043 | 1/1963 | Stearns et al. | 174/72 A X |
| 3,210,032 | 10/1965 | Van Slyke | 174/72 A X |
| 3,459,878 | 8/1969 | Gressitt et al. | 174/117 R X |
| 3,733,428 | 5/1973 | Fry | 174/72 A |

FOREIGN PATENTS OR APPLICATIONS
| | | | |
|---|---|---|---|
| 2,012,852 | 1/1971 | Germany | 174/72 A |
| 45-29149 | 9/1970 | Japan | 174/72 A |

Primary Examiner—Laramie E. Askin
Attorney, Agent, or Firm—Holman & Stern

[57] ABSTRACT

A wiring harness including an elongate thermoplastic backing strip to which are secured first and second electrical leads. Each of the leads includes a conductive core in a thermoplastic sheath, and the leads are physically and electrically interconnected. The leads are secured to the backing strip by having their sheaths fused to the backing strip. An insulating cover member is secured to the assembly of the leads and the backing strip and covers the point of interconnection of the leads. The cover member can be a sheet of thermoplastic material, or can be a sleeve actually encircling the point of interconnection of the leads.

7 Claims, 4 Drawing Figures

WIRING HARNESSES

This invention relates to a wiring harness particularly but not exclusively for use in a vehicle.

A wiring harness according to the invention includes an elongate thermoplastic backing strip, first and second electrical leads each comprising a conductive core and a thermoplastic sheath, said leads being physically and electrically interconnected and the sheaths of the leads being fused to the backing strip at least adjacent the point of interconnection of the leads to secure the leads in position relative to the backing strip, and an insulating cover member secured to the assembly defined by the leads and the backing strip in a position covering the point of interconnection of the leads.

Conveniently, said cover member is a thermoplastic sheet overlying the point of interconnection of said leads and fused to said backing strip so that the interconnected regions of the leads are sandwiched between the thermoplastic sheet and the backing strip.

Alternatively the cover member is an insulating sleeve into which said leads extend, the point of interconnection of the leads being within the sleeve.

Conveniently the sleeve is secured in position by virtue of fusing of the sheaths of the leads, where they extend from the opposite ends of the sleeve, to the backing strip.

Alternatively the sleeve is formed from thermoplastic material and is itself fused to the backing strip.

Desirably a third, similar lead is physically and electrically connected to the first and second leads at said point of interconnection, the third lead also having its sheath fused to the backing strip at least adjacent said point of interconnection.

Preferably said second and third leads extend in the same general direction along the backing strip and the backing strip is bifurcated with said second and third leads on respective limbs of the backing strip so that in use the first lead can be connected by way of the second and third leads to two physically spaced components.

Figure 2:
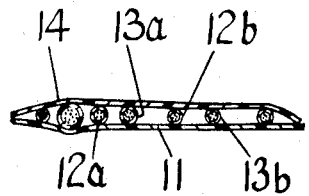
Figure 3:
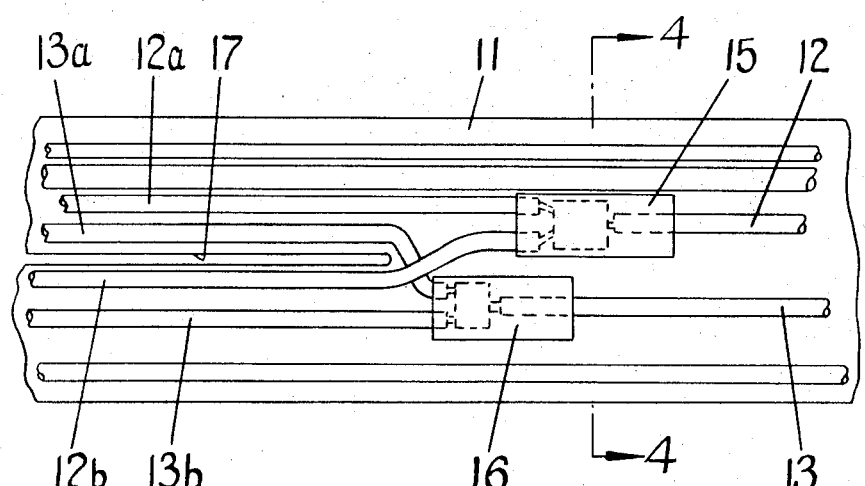
Figure 4:
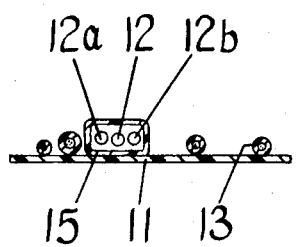

In the accompanying drawings,

FIG. 1 is a diagrammatic plan view of part of a wiring harness in accordance with a first example of the invention, FIG. 2 is a sectional view on the line 2—2 in FIG. 1, FIG. 3 is a view similar to FIG. 1 of a wiring harness in accordance with a second example of the invention, and FIG. 4 is a sectional view on the line 4—4 in FIG. 4.

Referring first to FIGS. 1 and 2 of the drawings the wiring harness includes a backing strip 11 formed from thermoplastic material, conveniently polyvinylchloride. The harness further includes a plurality of electrical leads each of which consists of a conductive core within an insulating sheath of thermoplastic material again conveniently polyvinylchloride. The leads of the harness are secured in position relative to one another, and to the backing strip 11 by having their sheaths fused to the backing strip conveniently along substantially the whole of their length. At certain points in a harness it becomes necessary to provide an electrical connection from single leads 12, 13 to each of a pair of spaced electrical components, for example the rear lamps of a road vehicle. To facilitate this, within the harness the single leads 12, 13 are spliced to respective pairs of leads 12a, 12b, 13a, 13b. The splice between the lead 12 and the leads 12a, 12b and between the lead 13 and the leads 13a, 13b is formed by stripping the sheath from the conductive core at one end of each of the leads, and then crimping and soldering a connector around the bared ends of the leads 12, 12a, 12b and similarly aroung the bared ends of the leads 13, 13a, 13b. Thus a physical and electrical connection is produced between the leads 12, 12a, 12b and between the leads 13, 13a, 13b. The leads of the harness are of course exposed on the backing strip 11 and are normally protected against accidental electrical shorting by their own sheaths. In order to protect the exposed points of interconnection of the leads 12, 12a, 12b, and of the leads 13, 13a, 13b there is provided an insulating cover member 14.

The cover member 14 is in the form of a sheet of thermoplastic insulating material and is laid over the leads on the harness so as to cover the points of interconnection of the leads 12, 12a, 12b and 13, 13a, 13b. The thermoplastic sheet is secured in position relative to the assembly defined by the leads and the backing strip by fusing the sheet to the backing strip 11 at least along the longitudinal edges of the backing strip 11, so that the leads, and the points of interconnection are sandwiched between the insulating sheet constituting the cover member 14, and the insulating backing strip 11.

The splicing of the leads is of course performed before the harness is constructed. The harness is constructed by laying the leads of the harness in the predetermined harness position on a platform, and then dispensing the backing strip 11 from a reel onto the leads, and simultaneously fusing the backing strip to the sheaths of the leads by the application of head to the mutually presented surfaces of the backing strip and the sheaths of the leads. At the points at which a splice occurs in the harness the thermoplastic sheet which is to constitute the cover member is positioned beneath the leads on the platform, so that as the backing strip is laid onto the leads, and simultaneously fused to the leads it is also simultaneously fused to the cover member.

In the example illustrated in FIGS. 3 and 4, the basic harness construction is identical with that described above, with the exception that the common cover member serving the splices of the leads 12 and the leads 13 is replaced by a pair of individual cover members 15, 16 in the form of insulating sleeves. As with the example described above, the splices are produced before the harness is constructed. The sleeves 15, 16 are threaded onto the leads 12, 13, and are moved to positions such that the points of interconnection of the leads 12 lie within the sleeve 15, and the points of interconnection of the leads 13 lie within the sleeve 16, prior to the leads being finally positioned on the platform on which the harness is constructed. Thus when the thermoplastic backing strip 11 is laid onto the leads, and is fused to the sheaths of the leads, the sleeves 15, 16 will be trapped in position against movement relative to the remainder of the harness by the fusing of the sheaths of the leads to the backing strip 11 where they project from the sleeves.

In a modification of the example shown in FIGS. 3 and 4 the sleeves 15, 16 are formed from thermoplastic material, and so are held in position covering the splices by being fused to the backing strip 11 as the sheaths of the leads and the backing strip 11 are fused.

In all of the examples described above, the leads 12a, 13a are intended for connection to components spaced from the components to which the leads 12b, 13b are to be connected. Thus the backing strip is bifurcated at one side of the splices, and the leads 12a, 13a extend along one limb of the backing strip 11 while the leads 12b, 13b extend along the other limb of the backing strip. The backing strip is of course flexible, and so the two limbs can be positioned in divergent relationship with ease if necessary. The slit 17 in the backing strip 11 which bifurcates the backing strip, can be formed by severing the backing strip as a last step in the manufacture of the harness, for example after the harness has been removed from the fabricating platform. However, it is envisaged that an electrically operated blade could be moved automatically to a position wherein it severs the backing strip as the backing strip is applied to the leads during the construction of the harness. Thus as the backing strip is applied to the leads to one side of the splices of the leads 12, 13 the blade will be inoperative, the knife being moved to its operative position as the application of the backing strip to the lead progresses beyond the splices.

While the harnesses described above are particularly intended for use in motor vehicles, it is to be appreciated that with minor modifications the harnesses can be used in other applications, for example in domestic appliances and the like.

I claim:

1. A wiring harness including an elongate thermoplastic backing strip, first and second electrical leads each comprising a conductive core and a thermoplastic sheath, said leads being physically and electrically interconnected and the sheaths of the leads being fused to the backing strip at least adjacent the point of interconnection of the leads to secure the leads in position relative to the backing strip, and an insulating cover member secured to the assembly defined by the leads and the backing strip in a position covering the point of interconnection of the leads.

2. A wiring harness as claimed in claim 1 wherein said cover member is a thermoplastic sheet overlying the point of interconnection of said leads and fused to said backing strip so that the interconnected regions of the leads are sandwiched between the thermoplastic sheet and the backing strip.

3. A wiring harness as claimed in claim 1 wherein said cover member is an insulating sleeve into which said leads extend, the point of interconnection of the leads being within the sleeve.

4. A wiring harness as claimed in claim 3 wherein said sleeve is secured in position by virtue of fusing of the sheaths of the leads, where they extend from the opposite ends of the sleeve, to the backing strip.

5. A wiring harness as claimed in claim 3 wherein the sleeve is formed from thermoplastic material and is itself fused to the backing strip.

6. A wiring harness as claimed in claim 1 wherein a third, similar lead is physically and electrically connected to the first and second leads at said point of interconnection, the third lead also having its sheath fused to the backing strip at least adjacent said point of interconnection.

7. A wiring harness as claimed in claim 6 wherein the said second and third leads extend in the same general direction along the backing strip and the backing strip is bifurcated with said second and third leads on respective limbs of the backing strip so that in use the first lead can be connected by way of the second and third leads to two physically spaced components.

* * * * *